United States Patent [19]

Tripp

[11] 4,352,917

[45] Oct. 5, 1982

[54] HYDROPHILIC COATINGS FOR TEXTILE MATERIALS

[75] Inventor: Jeffrey A. Tripp, Adrian, Mich.

[73] Assignee: SWS Silicones Corporation, Adrian, Mich.

[21] Appl. No.: 188,210

[22] Filed: Sep. 18, 1980

[51] Int. Cl.$^3$ ............................................. C08G 77/04
[52] U.S. Cl. ...................................... 528/26; 525/474; 525/479; 528/14; 528/21; 528/28; 556/413; 556/416; 556/418; 556/436; 556/437; 556/483; 427/387; 428/447
[58] Field of Search .................. 525/474, 479; 528/28, 528/14, 21, 26; 556/483, 413, 418, 416, 437, 436

[56] References Cited

U.S. PATENT DOCUMENTS 4,260,725  4/1981  Keogh et al. .......................... 528/28
4,275,184  6/1981  Bargain et al. ........................ 528/28

*Primary Examiner*—Melvyn I. Marquis

[57] ABSTRACT

Silylated organic polymers which may be applied to textile materials to impart hydrophilic properties thereto are prepared by reacting polymeric organic acids with silylated aminofunctional polyethers. The resultant composition may then be crosslinked to impart durable hydrophilic properties to textile materials treated therewith.

16 Claims, No Drawings

HYDROPHILIC COATINGS FOR TEXTILE MATERIALS

The present invention relates to hydrophilic coatings and more particularly to silylated organic polymers and a process for preparing silylated organic polymers which will impart a hydrophilic finish to textile materials treated therewith.

BACKGROUND OF INVENTION

Textile fabrics have been treated with silicon containing compositions to impart soil-repellent and soil-release properties thereto. For example, U.S. Pat. Nos. 3,716,517 and 3,716,518 to Pittman et al. disclose silicon copolymers which contain at least one monomer capable of imparting oleophobic properties and at least one monomer capable of imparting hydrophilic properties to textile fabrics. The oleophobic monomer is a silane which contains a terminal perfluoroalkyl group of from 3 to 18 perfluorinated carbon atoms. The hydrophilic monomer is a silane which contains two or more alkylene oxide groups in which the alkylene groups contain from 2 to 6 carbon atoms.

U.S. Pat. No. 3,236,685 to Caldwell et al. describes a process for imparting soil-resistance to fabric by coating the fabric with a solution containing a polymeric acid having —COOH, —SO$_3$H and/or —PO$_4$H$_2$ groups.

Also, U.S. Pat. No. 3,377,249 to Marco describes a process for imparting soil release and durable press characteristics to textile materials containing linear polyester fibers which comprises applying a composition containing an aminoplast textile resin, a textile resin catalyst and a synthetic acid emulsion polymer to the textile material and thereafter curing the textile resin.

Thus, one of the advantages of this invention is that the silylated organic polymers will crosslink to form hydrophilic coatings on textile fibers or fabrics treated therewith. The hydrophilic property improves the comfort of the textile fabrics by wicking away body perspiration. Moreover, the silylated organic polymers of this invention improve soil release properties of textile fabrics during laundering. Furthermore, the silylated organic polymers of this invention impart resistance to soil redeposition to textile fabrics treated therewith during laundering. In certain applications textile fabrics treated with these silylated organic polymers exhibit permanent press properties.

Therefore, it is an object of this invention to provide silylated organic polymers. Another object of this invention is to provide silylated organic polymers which may be applied to textile fabrics to provide resistance to soiling. A further object of this invention is to provide silylated organic polymers which may be applied to textile fabrics to impart hydrophilic properties thereto.

SUMMARY OF INVENTION

The foregoing objects and others which will become apparent from the following description are accomplished in accordance with this invention, generally speaking, by providing silylated organic polymers which are obtained from the reaction of polymeric organic acids having at least one acid group with silylated aminofunctional polyethers at a temperature of from about −10° C. up to about 200° C. The resultant composition may be applied to textile materials and cured at a temperature of at least 25° C. to impart hydrophilic properties to the treated textile materials.

DETAILED DESCRIPTION OF INVENTION

The silylated organic polymers of this invention are prepared by reacting silylated aminofunctional polyethers with polymeric organic acids in the presence or absence of an inert diluent. The diluent may be a solvent for the reactants or it may be a dispersant for one or more of the reactants. Preferably, the reaction between the polymeric organic acids and silylated aminofunctional polyethers is conducted in the presence of a diluent.

Examples of suitable diluents which may be employed are water, aliphatic hydrocarbons such as pentane, hexane octane, aromatic hydrocarbons such as benzene, xylene, toluene, chlorinated hydrocarbons and ethers such as di-n-butylether.

Generally, it is preferred that the diluent be present in an amount of from 0.1 to 99.9 percent and more preferably from 99.25 to 50 percent by weight based on the weight of the composition and diluent.

The temperature employed in preparing the silylated organic polymer compositions of this invention is not critical and may range from about −10° to 200° C. and more preferably from about 20° to 150° C.

The reaction between the silylated aminofunctional polyethers and the polymeric organic acids may be conducted at atmospheric, sub-atmospheric or super-atmospheric pressures. Preferably the reaction is conducted at atmospheric pressure.

Other basic compounds which are capable of neutralizing the acid groups of the polymeric organic acids may also be included in the compositions of this invention. These basic compounds may be reacted with the polymeric organic acids prior to reacting the polymeric organic acids with the silylated aminofunctional polyethers or during the reaction of the polymeric organic acids with the silylated aminofunctional polyethers or after the silylated aminofunctional polyether has been reacted with the polymeric organic acids. When the basic compounds are reacted with the polymeric organic acids, prior to the reaction with the silylated aminofunctional polyether it is essential that an average of at least one acid group per molecule of the polymeric organic acid be present to react with the silylated aminofunctional polyether.

Examples of basic compounds which are capable of neutralizing the acid groups of the polymeric organic acids prior to, during or after the reaction with the silylated aminofunctional polyethers are alkali metal hydroxides and alkoxides, primary, secondary and tertiary amines, amine-terminated polyethers and ammonia.

Specific examples of alkali metal hydroxides and alkoxides are sodium hydroxide, potassium hydroxide, cesium hydroxide, sodium methoxide, potassium ethoxide, cesium butoxide and the like.

Specific examples of amines, which include primary, secondary, and tertiary amines are methylamine, dimethylamine, triethylamine, ethanolamine, propanolamine, diethanolamine, triethanolamine, benzylamine, benzylaniline, aniline, butyl ethylamine, allylamine, diallylamine, didodecylamine, dicyclohexylamine, diisoamylamine, ethylene diamine, and the like.

The amount of polymeric organic acids present in the reaction with the silylated aminofunctional polyethers is not critical and may vary over a wide range. It is, however, essential that at least one acid group be available for reacting with the silylated aminofunctional polyether. In certain applications it is advantageous to react the polymeric organic acids with the silylated aminofunctional polyether and if desired other basic compounds, in such a ratio that only a portion of the acid groups are reacted with the silylated aminofunctional polyethers and basic compounds, if present. In other applications it is advantageous to react the polymeric organic acids with the silylated aminofunctional polyethers and, if desired, other basic compounds in such a ratio that all the acid groups are reacted. Likewise, in other applications it has been found desirable to use an excess of silylated aminofunctional polyethers and basic compounds, if present, thereby forming a mixture containing silylated polymeric organic acid salts, silylated aminofunctional polyethers and basic compounds.

Generally, it is preferred that an average of from 1 to 100 percent of the equivalents of acid per gram of polymeric organic acids be reacted with the silylated aminofunctional polyether and basic compounds, if present, with the proviso that an average of at least one acid group per molecule of the polymeric organic acids must be reacted with a silylated aminofunctional polyether. More preferably, an average of from 10 to 50 percent of the equivalents of acid per gram of polymeric organic acids are reacted with silylated aminofunctional polyethers and basic compounds, if present.

Likewise, it is preferred that an average of from 1 to 100 percent of the equivalents of base per gram of silylated aminofunctional polyether and basic compounds, if present, be reacted with the polymeric organic acids, with the proviso that at least one silylated aminofunctional polyether be reacted with an acid group. More preferably, an average of from 50 to 100 percent of the equivalents of base per gram of silylated aminofunctional polyether are reacted with the polymeric organic acids.

The products obtained from the reaction of the polymeric organic acids and silylated aminofunctional polyethers and basic compounds, if present, will crosslink in the presence of moisture. However, crosslinking can be retarded when an excess of water is present. Also, crosslinking can be accelerated by heating the compositions of this invention at an elevated temperature in the presence of moisture. Generally, crosslinking may be affected at a temperature of from 25° C. to 200° C., and more preferably at a temperature of from 80° to 170° C.

The silylated aminofunctional polyethers reacted with the polymeric organic acids in this invention and their method of preparation are described in copending application Ser. No. 074,188 filed on Sept. 10, 1979 which is incorporated herein by reference. These silylated aminofunctional polyethers may be represented by the formula:

$$\begin{array}{l} CH_2(OC_nH_{2n})_xR\ A \\ [CH\ (OC_nH_{2n})_xR\ A]_a \\ CH_2(OC_nH_{2n})_xR\ A \end{array}$$

wherein R, which may be the same or different, is a radical represented by the formula:

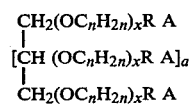

or an ammonium radical represented by the formula:

wherein $R^1$ which may be the same or different, is hydrogen, a monovalent hydrocarbon radical, or a silicon containing radical selected from the following formulas:

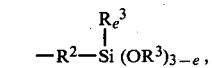

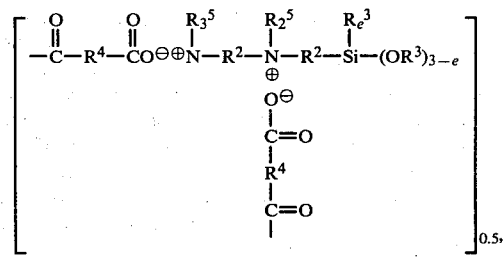

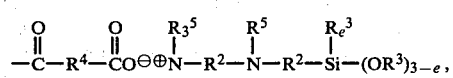

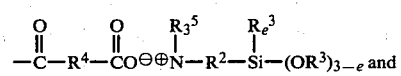

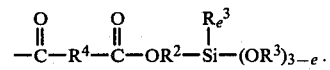

When R is cationic

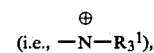

then A, which may be the same or different, is an anionic silicon containing radical selected from the following formulas:

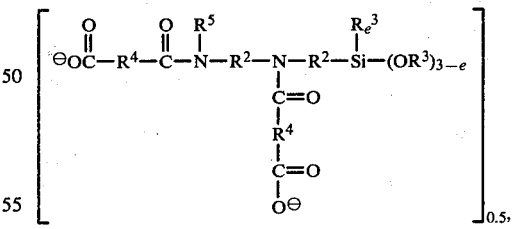

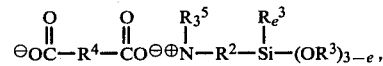

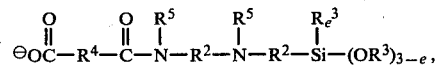

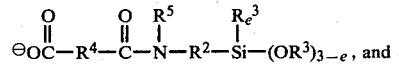

-continued

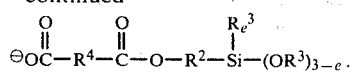

When R is nonionic

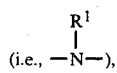

(i.e., $-\overset{R^1}{\underset{|}{N}}-$), then A is hydrogen, a monovalent hydrocarbon radical, or a silicon containing radical selected from the following formulas:

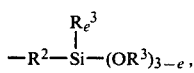

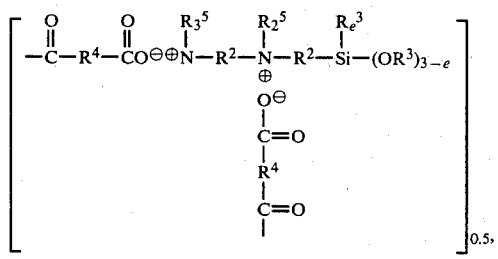

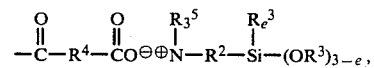

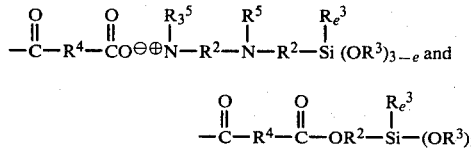

It is essential that at least one A or one $R^1$ be a silicon-containing radical and that at least one amine group be present to react with the polymeric organic acid.

In the above formulas $R^2$ is a divalent radical, $R^3$ is a monovalent hydrocarbon radical having from 1 to 18 carbon atoms, $R^4$ is a divalent hydrocarbon radical selected from the group consisting of $(CH_2)_y$, $CH=CH$ or a cyclic hydrocarbon radical selected from the group consisting of $C_6H_4$, $C_6H_8$, $C_6H_{10}$ and $C_{10}H_6$, $R^5$ which may be the same or different, is hydrogen or a monovalent hydrocarbon radical, a is a number of from 0 to 4, e is 0, 1, 2 or 3, n is a number of from 2 to 4, x is a number of from 1 to 600 and y is a number of from 0 to 16.

Suitable examples of divalent hydrocarbon radicals represented by $R^2$ are ethylene, trimethylene, hexamethylene and octamethylene radicals. Other divalent radicals represented by $R^2$ are hydrocarbonoxy containing radicals of the formula:

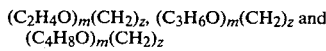

where m is from 1 to 50, and z is a number of from 1 to 10, as well as ethylene oxide, trimethylene oxide, tetramethylene oxide and vinylene, propenylene, butenylene, hexenylene and the like.

Suitable examples of monovalent hydrocarbon radicals represented by $R^1$, $R^3$, $R^5$ and A which have from 1 to 18 carbon atoms are alkyl radicals, e.g., methyl, ethyl, propyl, butyl, hexyl, octyl, decyl, dodecyl and octadecyl radicals; aryl radicals, e.g., the phenyl radical; alkaryl radicals, e.g., tolyl, xylyl and ethylphenyl radicals; cycloalkyl radicals, e.g., cyclobutyl, cyclohexyl and cyclodecyl radicals and aralkyl radicals, e.g., benzyl, 2-phenylethyl and 2-phenylpropyl radicals.

Examples of divalent radicals represented by $R^4$ are ethylene, trimethylene, pentamethylene, hexamethylene, dodecamethylene, and hexadecamethylene. Examples of cyclic divalent radicals are phenylene, cyclohexylene, cyclohexenylene and naphthenylene.

These silylated aminofunctional polyethers may be prepared, for example, by reacting an aminofunctional silane with a cyclic anhydride to form a carboxylic acid functional silane. The silane is then reacted with an amine terminated oxyalkylene polymer. The reaction may be illustrated by the following equations:

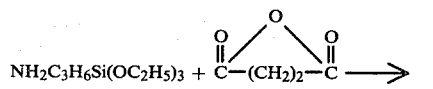

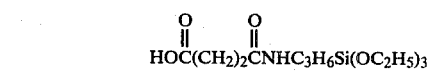

wherein n and x are the same as defined above.

Another method for preparing the silylated aminofunctional polyethers is to react a haloalkyltrialkoxysilane with an amine terminated polyether in the presence of an acid acceptor, e.g., triethylamine, alkali metal alkoxides or aryloxides and a hydrocarbon solvent, e.g., xylene. The byproduct, e.g., triethylamine hydrochloride is removed by filtration and the solvent is removed at reduced pressure at an elevated temperature.

Still another method for preparing the silylated aminofunctional polyethers is to react an aminofunctional silane with a dicarboxylic acid and thereafter reacting the resultant carboxylic acid functional silane with an amine terminated polyether.

The silylated aminofunctional polyethers may also be prepared by reacting a dicarboxylic acid with a haloalkylalkoxysilane in the presence of an acid acceptor. The resultant carboxylic acid functional silane is then reacted with an amine terminated polyether.

Preferred examples of aminofunctional silanes which may be employed to prepare the silylated aminofunctional polyethers are beta-aminopropyltrimethoxysilane, gamma-aminopropyltriethoxysilane, methyl-beta-(aminoethyl)-gamma-aminopropyldimethoxysilane, omega-aminohexyltributoxysilane, beta-(aminoethoxy)-propyltrimethoxysilane, beta-(aminoethoxy)hexyltriethoxysilane, beta-(aminopropoxy)butyltributoxysilane, beta-(aminoethyl)-gamma-aminopropyltrimethoxysilane and silanes of the formula:

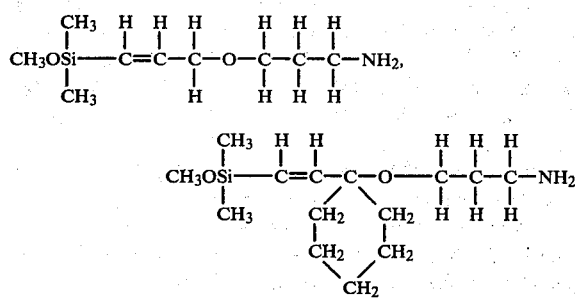

and the like.

Specific examples of cyclic anhydrides which may be used to form the silylated aminofunctional polyethers are succinic anhydride, glutaric anhydride, maleic anhydride, 1,2-cyclohexane dicarboxylic anhydride, 1-cyclohexene-1,2-dicarboxylic anhydride, 2-cyclohexene-1,2-dicarboxylic anhydride, 3-cyclohexene-1,2-dicarboxylic anhydride, 4-cyclohexene-1,2-dicarboxylic anhydride, 1,8-naphthalic acid anhydride and phthalic anhydride.

Specific examples of dicarboxylic acids which may be employed to make the silylated aminofunctional polyethers are oxalic acid, malonic acid, maleic acid, succinic acid, glutaric acid, adipic acid, pimelic acid, suberic acid, azelaic acid, sebacic acid and octadecandioic acid.

The amine terminated polyethers which may be reacted with the polymeric organic acids or which may be employed to form the silylated aminofunctional polyethers are illustrated by the following formula:

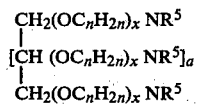

wherein a, n, x and $R^5$ which may be the same or different, are defined above.

The polymeric organic acids which are reacted with the silylated aminofunctional polyethers may be obtained from the polymerization of a polymerizable organic acid which contains aliphatic unsaturation. These polymers may be interpolymers of the acid and other monomers copolymerizable therewith. Examples of suitable polymerizable acids are acrylic acid, maleic acid, fumaric acid, methacrylic acid, itaconic acid, crotonic acid, cinnamic acid, polymerizable sulfonic acids, polymerizable phosphoric acids, etc. Monomers that may be interpolymerized with the acids include any monomers capable of copolymerizing with the acids and which will not detrimentally affect the film-forming properties of the resultant polymers. Suitable monomers include esters of the above acids prepared by reacting the particular acid with an alcohol, e.g., ethylacrylate, methyl acrylate, propyl acrylate, isopropyl acrylate, methyl methacrylate, ethyl methacrylate, 2-ethylhexyl acrylate, butyl acrylate, etc., alkyl fumarates, maleates, crotonates, cinamates, etc.; vinylhalides, monomers having vinylidene groups, e.g., styrene, acrylonitrile, methylstyrene; substituted vinyl monomers, e.g., chlorostyrene, butadiene, etc. Furthermore, salts of the acid polymers, e.g., sodium, potassium, lithium, ammonium, etc., may be employed in the present invention.

Examples of some of the acid polymers which may be used in the present invention are polymers obtained from the copolymerization of ethyl acrylate and acrylic acid, ethyl acrylate-acrylic acid-acrylamide, butyl acrylate-acrylic acid, ethyl acrylate-methacrylic acid, ethylacrylate-itaconic acid, methyl methacrylate-acrylic acid, 2-ethyl hexyl acrylate-acrylic acid, butyl acrylate-acrylic acid-acrylamide, ethyl acrylate-acrylic acid-N-methylol acrylamide, ethyl acrylate-acrylic acid-styrene, ethylacrylate-acrylic acid-hydroxy propyl methacrylate, ethyl acrylate-acrylic acid-divinyl benzene, ethyl acrylate-acrylic acid-allyl acrylamide, ethyl acrylate-acrylic acid-glycidyl acrylate, ethyl acrylate-itaconic acid, ethyl acrylate-sodium styrene sulfonate, ethyl acrylate-crotonic acid, styrene-acrylic acid, ethyl acrylate-acrylic acid-hydroxy ethyl methacrylate, hydroxy ethyl methacrylate-acrylic acid-acrylamide, butyl acrylate-ethyl acrylate-acrylic acid and the like.

The polymeric organic acids are preferably prepared by emulsifying an organic acid or mixtures of organic acids or mixtures of organic acids and esters of organic acids in water and polymerizing the mixture while it is in the emulsified form. Generally, it is essential that a nonionic emulsifying agent be used.

The emulsions can be prepared at temperatures ranging from 0° C. up to about 100° C., and more preferably at temperatures of from about 10° to 60° C. Free-radical catalysts, especially peroxide catalytic systems, such as the redox type are recommended. Systems which are well known are combinations of oxidizing agents and reducing agents such as a combination of potassium persulfate and sodium metabisulfite. Other peroxide agents include the alkali metal and ammonium persulfates and perborates, hydrogen peroxide, organic hydroperoxides such as tert-butyl hydroperoxide and cumene hydroperoxide, and esters such as tert-butyl perbenzoate. Other reducing agents include water-soluble thiosulfates and hydrosulfites and the salts, such as sulfates of metals which are capable of existing in more than one valence state such as cobalt, iron, nickel and copper. A preferred method for preparing the copolymer emulsions comprises agitating an aqueous suspension of a mixture of polymerizable monomers and a redox catalytic combination at room temperature. The amount of catalyst can vary, but an amount of from 0.01 percent to 1.0 percent, based on the weight of the monomers, of the peroxidic agent, has been found to be sufficient and the same or lower proportions of the reducing agent are recommended. In this way it is possible to prepare dispersions which contain as little as 1 percent and as much as 60 percent of the polymer on a weight basis.

Nonionic emulsifiers which may be used for preparing the polymeric emulsions are alkylphenoxy-polyethoxyethanols having alkyl groups of about seven to eighteen carbon atoms and 6 to 60 or more oxyethylene units, such as heptylphenoxypolyethoxyethanols, octylphenoxypolyethoxyethanols, methyloctylphenoxypolyethoxyethanols, nonylphenoxypolyethoxyethanols, dodecylphenoxypolyethoxyethanols, and the like; polyethoxyethanol derivatives of methylene linked alkyl phenols; sulfur-containing agents such as those made by condensing 6 to 60 or more moles of the ethylene oxide with nonyl, dodecyl, tetradecyl, or t-dodecyl mercaptans or with alkylthiophenols having alkyl groups of from six to fifteen carbon atoms; ethylene oxide derivatives of long-chained carboxylic acids, such as lauric, myristic, palmitic, oleic and the like or mixtures of acids such as found in tall oil containing 6 to 60 oxyethylene units per molecule; analogous ethylene oxide condensates of long-chained alcohols, such as octyl, decyl, lauryl, or cetyl alcohols, ethylene oxide derivatives of etherified or esterified polyhydroxy compounds having a hydrophobic hydrocarbon chain, such as sorbitan monostearate containing 6 to 60 oxyethylene units, etc.; block copolymers of ethylene oxide and propylene oxide comprising a hydrophobic propylene oxide unit combined with one or more hydrophilic ethylene oxide units.

The silylated organic polymers of this invention can be applied to textile materials in admixture with other substances which have been used heretofore to impart certain properties to textile materials. Other substances which may be used in combination with the compositions of this invention are agents which improve abrasion resistance of the treated fibers, materials which improve the fragrance of the treated materials, antistatic agents, lubricants, fabric softeners and fire retardant agents.

The compositions of this invention may be applied in concentrated form or preferably dispersed in water or in organic solvents such as di-n-butylether, aliphatic hydrocarbons, aromatic hydrocarbons, and/or chlorinated hydrocarbons and then applied.

The stability of water dispersions of the compositions of this invention may also be enhanced by the addition of certain emulsifiers. Examples of such stabilizing agents include non-ionic emulsifiers such as nonylphenol ethylene oxide adducts, polyoxyethylene stearates, etc.; anionic emulsifiers such as sodium lauryl sulfate, sodium stearate, etc.; cationic emulsifiers such as quaternary ammonium chlorides, etc., or amphoteric emulsifiers such as amino acids, etc.

The compositions of this invention, and if desired other substances, may be applied to all textile materials, preferably organic textile materials on which organopolysiloxanes have been or could have been applied heretofore. Examples of such textile materials are wool, cotton, rayon, hemp, natural silk, polypropylene, polyethylene, polyester, polyurethane, polyamide, cellulose acetate, polyacrylonitrile fibers, and mixtures of such fibers. The textile materials may consist of staple or monofilament fibers and fabrics made thereof.

The compositions of this invention and other substances, if desired, may be applied to the textile materials by any means known in the art, such as by spraying, immersion, foaming, padding, calendering or by gliding the fibers across a base which has been saturated with the compositions of this invention.

Generally, the solids add-on is in the range of from 0.01 to 20 percent and preferably from about 0.025 to 10 percent, based on the weight of the original textile material.

After the textile material has been treated, it is cured at an elevated temperature, e.g., from about 50° to 200° C. for a brief period of time, e.g., from about 3 to 15 minutes.

Textile materials treated with the compositions of this invention exhibit hydrophilic and soil resistant properties.

Specific embodiments of this invention are further illustrated in the following examples in which all parts are by weight unless otherwise specified.

EXAMPLE 1

(a) A silylated aminofunctional polyether is prepared by mixing 222 parts of aminopropyltriethoxysilane with 100 parts succinic anhydride and stirred for 2 hours. The temperature of the reactants increases to about 100° C. as a result of an exotherm. The reaction product is cooled to room temperature, and 600 parts of an amine-terminated polyether having the formula:

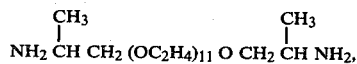

(available from Jefferson Chemical Co. as Jeffamine ED-600) are added to the above product and agitated for 2 hours. The temperature increases to about 50° C. The reaction product is cooled to room temperature yielding a clear, yellow liquid having a viscosity of 764.7 cs. at 25° C. A silylated aminofunctional polyether is obtained which has the following formula:

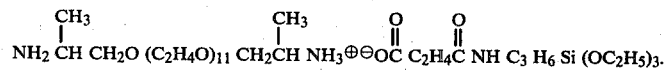

(b) About 25 parts of an aqueous emulsion of a polymeric carboxylic acid (available from Rohm & Haas, Inc. as ACRYSOL ASE-95) are mixed with the silylated aminofunctional polyether prepared in (a) above and 65 parts deionized water. An exotherm of about 5° C. is observed. The resultant mixture is a white-milky emulsion having a viscosity of 1,322 cs. at 25° C. in which approximately 30 percent of the carboxylic acid groups are neutralized as determined by titrating the free acid with a base.

(c) When about 2 parts of the product prepared in (b) above are placed in an aluminum dish and cured in a forced-air oven at 94° C. for 15 minutes, a continuous elastomeric film is formed.

COMPARISON EXAMPLE

The film properties of the product obtained in Example 1 are compared with the film properties obtained from a polymeric carboxylic acid emulsion (ACRYSOL ASE-95) and with the film properties obtained from a silylated aminofunctional polyether having the formula:

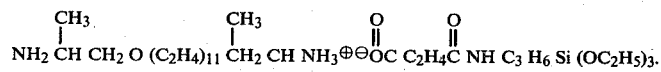

Each of these compositions are placed in aluminum dishes and cured in a forced-air oven at 94° C. for 15 minutes. The polymeric carboxylic acid emulsion forms a brittle solid which is easily fractured, the silylated aminofunctional polyether forms a film consisting of a liquid phase and a friable rubber, whereas the product from Example 1 forms a continuous elastomeric film.

EXAMPLE 2

(a) A silylated aminofunctional polyether is prepared by reacting 73 parts of adipic acid with 300 parts of the amine terminated polyether of Example 1(a) (JEFFAMINE ED-600), and 111 parts aminopropyltriethoxysilane. The reaction temperature increases from 50° to 75° C. The reaction mixture is stirred for 2 hours at 70° C. and then cooled to room temperature. The product, which is a clear, yellow liquid has the formula:

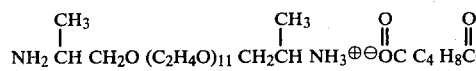

(b) About 50 parts of the polymeric carboxylic acid emulsion of Example 1(b) (ACRYSOL) are mixed with 4 parts of the silylated aminofunctional polyoxyethylene copolymer prepared in Example 2(a) above and 50 parts of deionized water. A slight exotherm is observed. The resultant mixture is a white-milky, homogeneous fluid having a viscosity of 640 cs. at 25° C., in which about 5 percent of the carboxylic acid groups are neutralized.

EXAMPLE 3

(a) A silylated aminofunctional polyether is prepared by reacting 300 parts of the amine terminated polyether of Example 1(a) (JEFFAMINE ED-600) with 50 parts of succinic anhydride. The reaction temperature increases to about 100° C. as a result of the exotherm. The mixture is stirred for 2 hours at about 70° C. and then cooled to room temperature. About 110.5 parts of aminopropyltriethoxysilane are added and the reaction temperature increases from about 20° C. to 30° C. After stirring the reaction mixture for about 1 hour at 30° C. a clear, yellow fluid having a viscosity of 150 cs. at 25° C. is recovered. The product may be represented by the following formula:

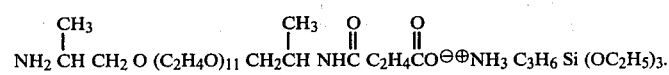

(b) About 50 parts of the polymeric carboxylic acid emulsion of Example 1(b) (ACRYSOL ASE-95) are mixed with about 10 parts of the silylated aminofunctional polyether prepared in (a) above and 41 parts of deionized water. A slight exotherm is observed. The resultant mixture is a white-milky homogeneous, low viscosity fluid in which about 15 percent of the carboxylic acid groups are neutralized.

(c) When about 2 parts of the product prepared in (b) above are placed in an aluminum dish and cured in a forced-air oven at 94° C. for 15 minutes, a continuous, elastomeric film is obtained.

EXAMPLE 4

(a) A silylated aminofunctional polyether is prepared by reacting 89 parts of beta-aminoethyl-gamma-aminopropyl trimethoxysilane [NH$_2$C$_2$H$_4$NHC$_3$H$_6$Si(OCH$_3$)$_3$] with 80 parts of succinic anhydride for about 2 hours with agitation. The reaction mixture is cooled to about 50° C., then 480 parts of the amine terminated polyether of Example 1(a) (JEFFAMINE ED-600) are added and then stirred for 1 hour at 60° C. The resultant silylated aminofunctional polyether is a clear, yellow liquid having a viscosity of 1,946 cs. at 25° C. It may be represented by the following formula:

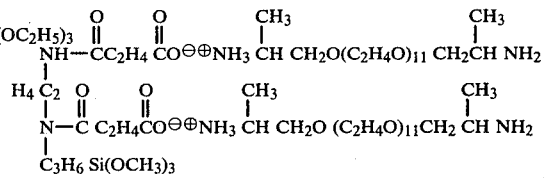

(b) About 50 parts of the polymeric carboxylic acid emulsion of Example 1 (ACRYSOL ASE-95) are mixed with 9 parts of the silylated aminofunctional polyether prepared in (a) above and 36 parts deionized water. The resultant mixture is a yellow, opaque fluid having a viscosity of about 200,000 cps at 25° C. in which about 15 percent of the carboxylic acid groups are neutralized.

(c) After heating 2 parts of the product in an aluminum dish in a forced-air oven at 94° C. for 15 minutes, a continuous, elastomeric film is obtained.

EXAMPLE 5

(a) A silylated aminofunctional polyether is prepared by mixing 22 parts of aminopropyltriethoxysilane with 10 parts succinic anhydride and stirred for 2 hours at a temperature of about 100° C. About 200 parts of an amine terminated polyether having the formula:

$$\text{CH}_3 \quad\quad\quad \text{CH}_3$$
$$\text{NH}_2\text{CH CH}_2\text{O (C}_2\text{H}_4\text{O)}_{43}\text{ CH}_2\text{CH NH}_2$$

(available from Jefferson Chemical Co as JEFFAMINE ED-2001) are added to the above product and stirred for about 2 hours at 80° C. and then cooled to room temperature. The resultant silylated aminofunctional polyether is a hard, white, water-soluble wax which has the following formula:

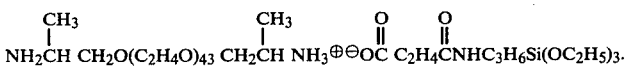

(b) About 96 parts of a polymeric carboxylic acid emulsion (ACRYSOL ASE-95) are mixed with 40 parts of the silylated aminofunctional polyether prepared in (a) above and 160 parts of deionized water. The resultant mixture is a white, milky, homogeneous liquid having a viscosity of 5,400 cs. at 25° C. in which about 12 percent of the carboxylic acid groups are neutralized as determined by titrating the free acid with a base.

(c) When a sample of the product prepared in (b) above is cured in accordance with the procedure described in Example 1(c) a continuous, elastomeric film is obtained.

EXAMPLE 6

About 8 parts of the silylated aminofunctional polyether prepared in Example 5(a) are mixed with 50 parts of a polyacrylic acid-polyethyl-acrylate emulsion and 58 parts of deionized water. The resultant mixture is a white, milky homogeneous fluid having a viscosity of 51 cs. at 25° C. in which about 15 percent of the carboxylic acid groups are neutralized.

EXAMPLE 7

A textile fabric consisting of 100 percent Dacron polyester is treated with the silylated polymeric organic emulsions prepared in the above examples by dipping the fabric in aqueous mixtures containing 2 percent by weight of the various compositions. The fabric is then dried for 2 minutes at 171° C. in a forced-air oven. The hydrophilic properties of the fabric are evaluated in accordance with the procedure described in the AATCC Test Method 39-1977 "Wettability: Evaluation Of." Each fabric is laundered five times and the wetting properties are evaluated after each wash cycle. Table I shows the results of these tests.

TABLE I

| | Wetting Times (Seconds) | | | | |
|---|---|---|---|---|---|
| Example No. | Initial | 1 Wash | 2 Washes | 3 Washes | 4 Washes | 5 Washes |
| 1 | 5 | 7 | 7 | 7 | 6 | 9 |
| 2 | 10 | 12 | 12 | 15 | 17 | 17 |
| 3 | 7 | 9 | 9 | 9 | 11 | 13 |
| 4 | 14 | 8 | 10 | 10 | 14 | 20 |
| 5 | 10 | 3 | 3 | 7 | 7 | 12 |

EXAMPLE 8

A textile fabric consisting of 100 percent Dacron polyester is treated with the silylated polymeric organic emulsions prepared in the above examples by dipping the fabric in aqueous mixtures containing 2 percent by weight of the various compositions. The fabric is then dried for 2 minutes at 171° C. in a forced-air oven. The soil release properties of the fabric are evaluated in accordance with the procedure described in the AATCC Test Method 130-1977 "Soil Release: Oily Stain Release Method." Table II shows the results of these tests.

TABLE II

| Soil Release Properties | |
|---|---|
| Example No. | Soil Release Rating |
| 1 | 2 |
| 3 | 2 |
| 4 | 2 |
| 5 | 3-4 |
| 6 | 3 |

EXAMPLE 9

Other fabrics including cotton, wool, nylon, polyesters, rayon and blends thereof were treated with the composition of Example 5 in accordance with the procedures described in Examples 7 and 8. Fabrics having hydrophilic properties and favorable soil release characteristics were obtained.

What is claimed is:

1. A process for preparing silylated organic polymers which comprises reacting a polymeric organic acid containing at least one acid group per molecule which is obtained from the polymerization of an organic acid having aliphatic unsaturation with a silylated aminofunctional polyether at a temperature of from −10° C. to 200° C., in which the silylated aminofunctional polyether has the formula:

$$CH_2(OC_nH_{2n})_xR\ A$$
$$[CH\ (OC_nH_{2n})_xR\ A]_a$$
$$CH_2(OC_nH_{2n})_xR\ A$$

wherein R is a radical selected from the group consisting of:

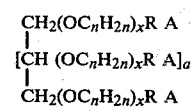

$R^1$ is selected from the class consisting of hydrogen, a monovalent hydrocarbon radical and a silicon containing radical selected from the group consisting of:

 (a)

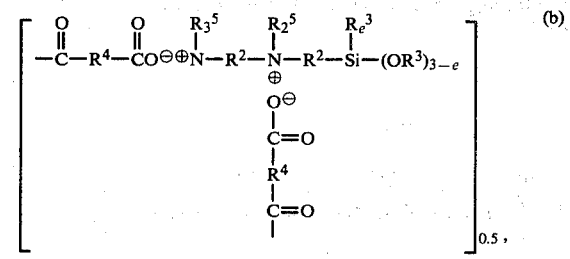 (b)

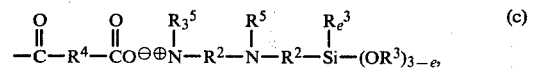 (c)

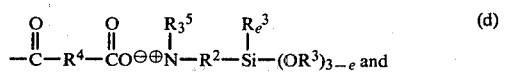 (d)

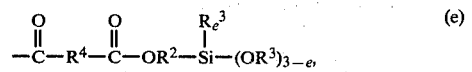 (e)

and when R is

A is an anionic silicon containing radical selected from the group consisting of:

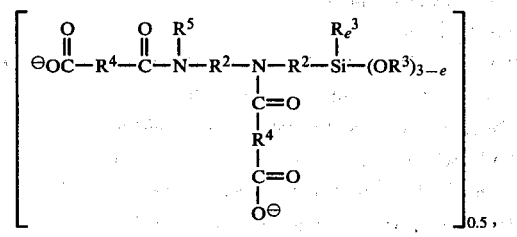 (f)

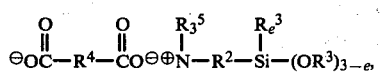 (g)

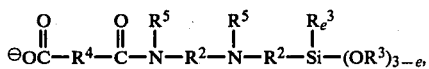 (h)

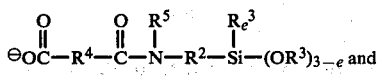 (i)

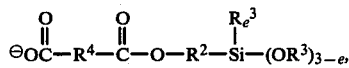 (j)

and when R is

then A is selected from the group consisting of hydrogen, a monovalent hydrocarbon radical, and a silicon containing radical selected from the group consisting of:

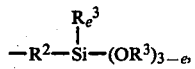 (k)

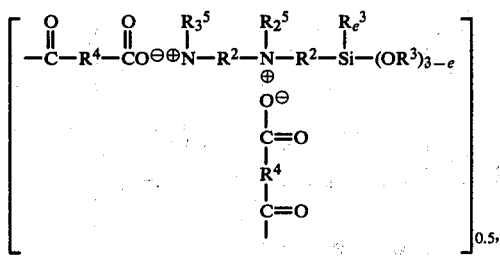 (l)

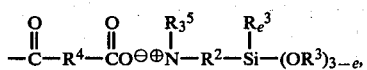 (m)

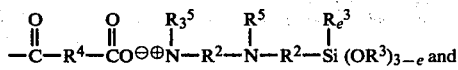 (n)

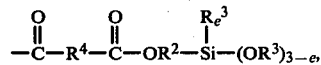 (o)

$R^2$ is a divalent radical, $R^3$ is a monovalent hydrocarbon radical having from 1 to 18 carbon atoms, $R^4$ is a divalent hydrocarbon radical selected from the group consisting of $(CH_2)_y$, $CH=CH$ or a cyclic hydrocarbon radical selected from the group consisting of $C_6H_4$, $C_6H_8$, $C_6H_{10}$ and $C_{10}H_6$, $R^5$ is selected from the group consisting of hydrogen and a monovalent hydrocarbon radical, with the proviso that at least one A or $R^1$ is a silicone containing radical, a is a number of from 0 to 4, e is 0, 1, 2 or 3, n is a number of from 2 to 4, x is a number of from 1 to 600 and y is a number of from 0 to 16.

2. The process of claim 1, wherein the reaction between the silylated aminofunctional polyether and polymeric organic acid is conducted in the presence of a basic compound selected from the group consisting of alkali metal hydroxides, alkali metal alkoxides, amines, amine terminated polyethers and ammonia.

3. The process of claim 1, wherein the polymeric organic acid is first reacted with a basic compound selected from the group consisting of alkali metal hydroxides, alkali metal alkoxides, amines, amine terminated polyethers and ammonia to partially neutralize a portion of the polymeric organic acid groups, and then reacted with a silylated aminofunctional polyether.

4. The process of claim 1, wherein the silylated organic polymers are reacted with a basic compound selected from the group consisting of alkali metal hydroxides, alkali metal alkoxides, amines, amine terminated polyethers and ammonia.

5. The process of claim 1, wherein the silylated aminofunctional polyether has the formula:

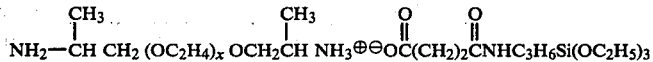

wherein x is a number of from 1 to 600.

6. The process of claim 1, wherein the polymeric organic acid is an acrylic acid polymer.

7. The process of claim 1, wherein the silylated aminofunctional polyether and polymeric organic acid are present in such an amount that an average of at least one acid group per molecule of the polymeric organic acid is reacted with the silylated aminofunctional polyethers.

8. The process of claim 1, wherein an average of from 1 to 100 percent of the equivalents of acid per gram of polymeric organic acid is reacted with the silylated aminofunctional polyether.

9. The process of claim 8, wherein an average of from 10 to 50 percent of the equivalents of acid per gram of polymeric organic acid are reacted with the silylated aminofunctional polyether.

10. The process of claim 1, wherein an average of from 1 to 100 percent of the equivalents of acid per gram of polymeric organic acid are reacted with the silylated aminofunctional polyether and basic compound selected from the group consisting of alkali metal hydroxides, alkali metal alkoxides, amines, amine terminated polyethers and ammonia, with the proviso that at least one acid group is reacted with the silylated aminofunctional polyether.

11. The process of claim 1, wherein the reaction is conducted in the presence of a diluent.

12. The process of claim 1, wherein the diluent is a solvent for the silylated aminofunctional polyether and the polymeric organic acid.

13. The product obtained from the process of claim 1.
14. The product obtained from the process of claim 2.
15. The product obtained from the process of claim 3.
16. The product obtained from the process of claim 4.

* * * * *